United States Patent
Keith

(10) Patent No.: US 6,471,856 B1
(45) Date of Patent: Oct. 29, 2002

(54) PRE-FILTER FOR A HOT TUB SKIMMER BASKET

(75) Inventor: Danny A. Keith, Morrow, OH (US)

(73) Assignee: Keith Brothers, Inc., Ponte Verda Beach, FL (US)

( * ) Notice: Subject to any disclaimer, the term of this patent is extended or adjusted under 35 U.S.C. 154(b) by 0 days.

(21) Appl. No.: 09/946,210

(22) Filed: Sep. 6, 2001

(51) Int. Cl.[7] .............................................. B01D 35/02
(52) U.S. Cl. ...................... 210/167; 210/169; 210/238; 210/416.2; 210/489
(58) Field of Search ................................ 210/167, 169, 210/232, 238, 416.1, 416.2, 470, 471, 488, 489; 4/496

(56) References Cited

U.S. PATENT DOCUMENTS

| | | | |
|---|---|---|---|
| 4,349,434 A | * | 9/1982 | Jaworski ..................... 210/149 |
| 4,637,873 A | * | 1/1987 | DeSousa et al. ............ 210/169 |
| 4,676,894 A | * | 6/1987 | Diamond et al. ........... 210/167 |
| 4,921,600 A | * | 5/1990 | Meissner ..................... 210/169 |
| 4,921,606 A | | 5/1990 | Goldman |
| 5,045,194 A | | 9/1991 | Gershenson |
| 5,672,271 A | | 9/1997 | Dye |
| 6,007,714 A | | 12/1999 | Keith |
| 6,395,167 B1 | * | 5/2002 | Mattson et al. ............. 210/169 |

* cited by examiner

*Primary Examiner*—David A. Simmons
*Assistant Examiner*—Fred Prince
(74) *Attorney, Agent, or Firm*—Charles R. Wilson

(57) ABSTRACT

A pre-filter is for use in a skimmer basket of a hot tub. The pre-filter comprises a stabilizing ring and a shallow shaped cleanable filter permanently secured together. The stabilizing ring is dimensioned for placement within the skimmer basket or on a rim of the skimmer basket. The cleanable filter is made of a water porous synthetic material. Debris is trapped on the shaped cleanable filter as hot tub water is pulled through it on its way to a primary filter apparatus. The pre-filter is easily separated from the skimmer basket, cleaned if desired or simply replaced with a new pre-filter. A paper filter cartridge of the primary filter apparatus in the hot tub has its life significantly increased by use of the pre-filter.

19 Claims, 5 Drawing Sheets

PRE-FILTER FOR A HOT TUB SKIMMER BASKET

FIELD OF THE INVENTION

This invention relates to a pre-filter. More particularly, the invention relates to a pre-filter for use in a hot tub skimmer basket to filter debris from recirculating water prior to reaching a primary filter apparatus.

BACKGROUND OF THE INVENTION

Hot tubs are not uncommon. They often are found in motels, rental vacation homes and are increasingly becoming more common in homes. Typically, the hot tubs hold about 300 gallons to about 1,000 gallons water. They comprise a fibrous reinforced resin shell to hold the water and a cabinet around the shell primarily for appearance purposes. A mechanical compartment within the cabinet houses a water pump, heater, primary filter apparatus and associated equipment. Many hot tubs are installed outdoors. In all cases, the water must be first run through a skimmer basket and then the primary filter apparatus to remove debris, including airborne material such as fallen leaves, other plant material, insects, and material brought into the hot tub by the user such as hair, lint, soap residue and body oils. Since water within the hot tub is continuously recirculated, it is essential that the primary filter apparatus be long lasting and operate efficiently.

More specifically, the typical hot tub has a water intake compartment which draws water from at least the surface of the hot tub. The water is initially pulled through the aforementioned skimmer basket and primary filter apparatus before being finally returned to the hot tub. The skimmer basket is a shallow rigid mesh basket which filters out larger debris, primarily to protect the primary filter apparatus immediately downstream from the basket. Known primary filter apparatus for hot tubs use one large fluted paper filter cartridge or a set of smaller cartridges operating together. Most, if not all, have anti-bacterial properties to maintain the water's purity. Periodically, the filter cartridge in the filter apparatus becomes clogged or ineffective and must be replaced. The task is not particularly arduous, but is time consuming. The filter cartridge must be freed from its seating, removed, discarded and a new filter cartridge installed. Needless to say, the typical hot tub owner would rather not be bothered by the needed upkeep. Additionally, there is a cost associated with the fluted filter cartridge itself.

There is a need for a filter system to lessen or even eliminate the current necessity of periodic replacing of the fluted paper filter cartridge in the filter apparatus of hot tubs. In accord with a continued need for an improved filtering system, there has now been developed a pre-filter for use in the hot tub's water recirculating flow path. The pre-filter is economical to produce, easy to use and efficient in operation. The pre-filter of the invention effectively filters debris of all sorts from the hot tub water before it reaches the hot tub's primary filter assembly. The pre-filter is very conveniently cleaned and reused or simply replaced. It does not interfere with the filter cartridge's anti-bacterial features.

SUMMARY OF THE INVENTION

A pre-filter is adapted for use in a water recirculating flow path of a hot tub. The pre-filter comprises a stabilizing ring and a shallow shaped cleanable filter permanently secured to the ring. The stabilizing ring is dimensioned for placement on a rigid support surface such as a rim of a skimmer basket or on a base of the skimmer basket. The cleanable filter is made of a water porous material. Water is pulled through the pre-filter with debris trapped on the filter. The pre-filter is easily removed and then cleaned or replaced.

DETAILED DESCRIPTION OF THE INVENTION

Figure 1:
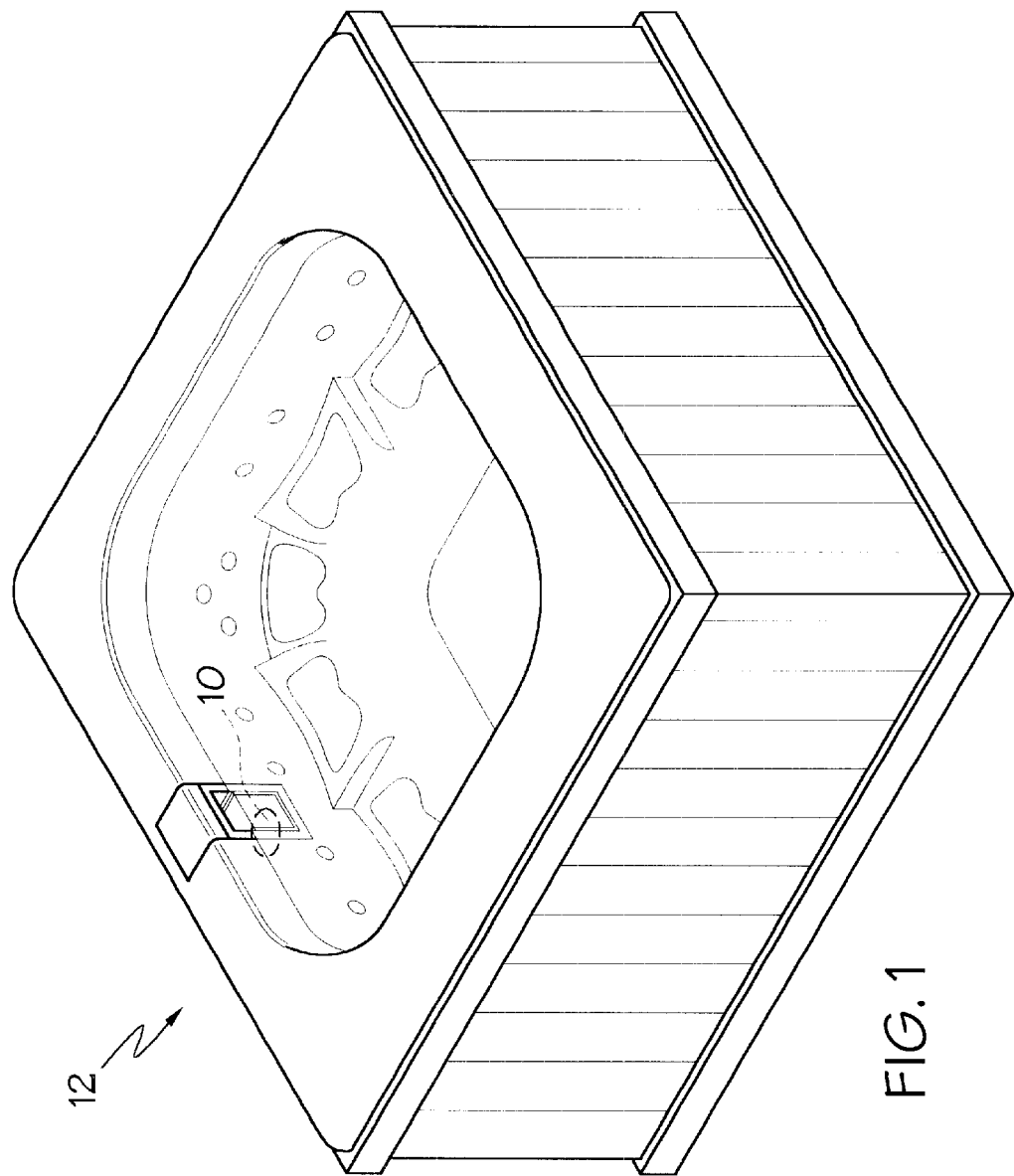
FIG. 1 is an environmental view of a hot tub showing a water intake where the pre-filter of the invention is positioned in a skimmer basket of a filter apparatus.

The pre-filter of the invention is described with reference to the drawings and in the following paragraphs. A typical shaped and sized hot tub is depicted in the drawings. It should be understood that the pre-filter is useful with hot tub and spa models of differing shapes and differing capacities and also with similar structures serving the same purpose.

The hot tub depicted and described in detail has a skimmer basket as part of the original equipment. The skimmer basket serves as a rigid support to hold the pre-filter of the invention. Feasibly, the skimmer basket can be eliminated and a rigid frame can be configured to hold the pre-filter. Such a use for the pre-filter is within the scope of the invention. However, hot tubs with skimmer baskets are currently of most commercial importance and all description to follow is with respect to this contemplated use.

Figure 2:
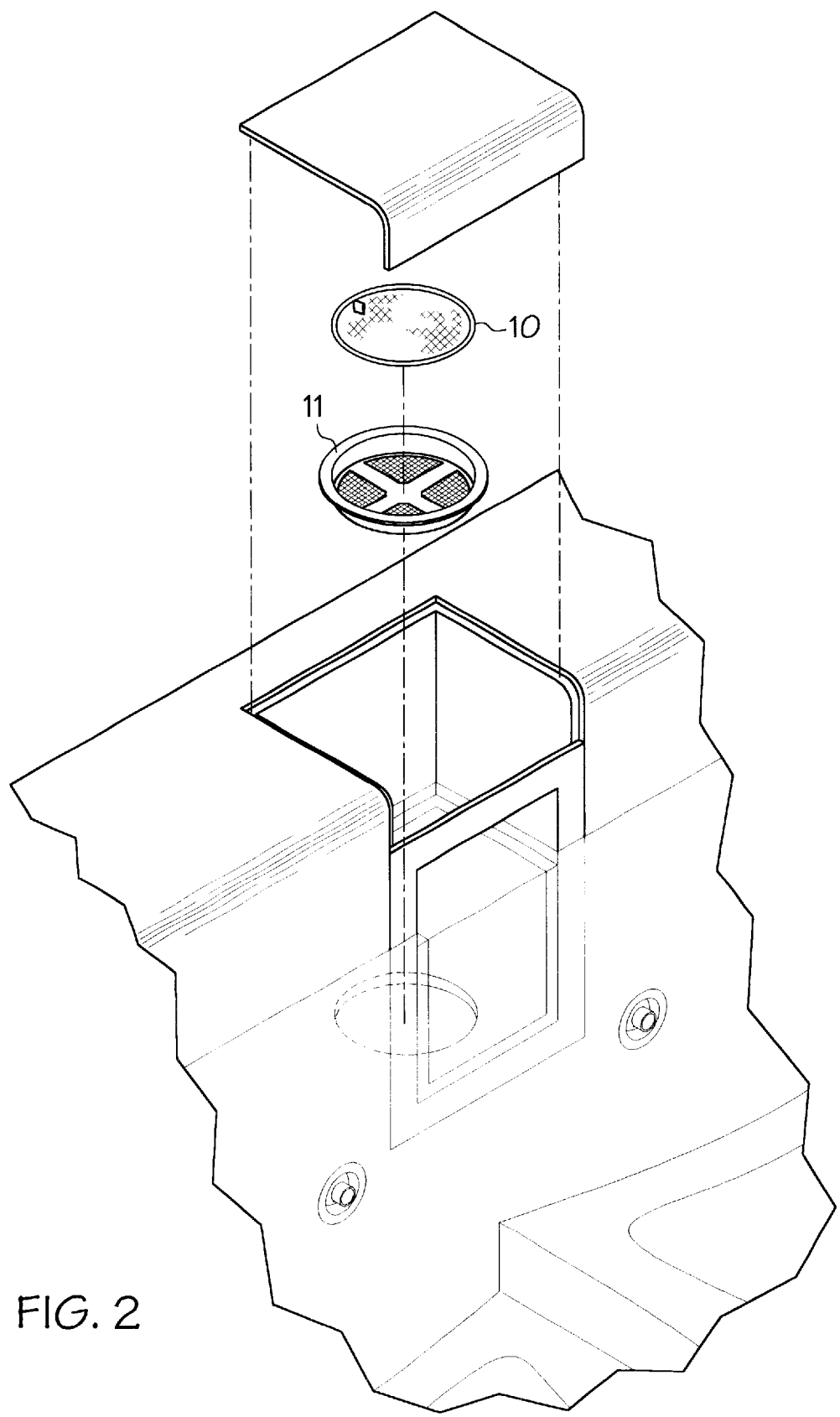
FIG. 2 is an exploded view showing the skimmer basket and the pre-filter isolated from the hot tub.
Figure 3:
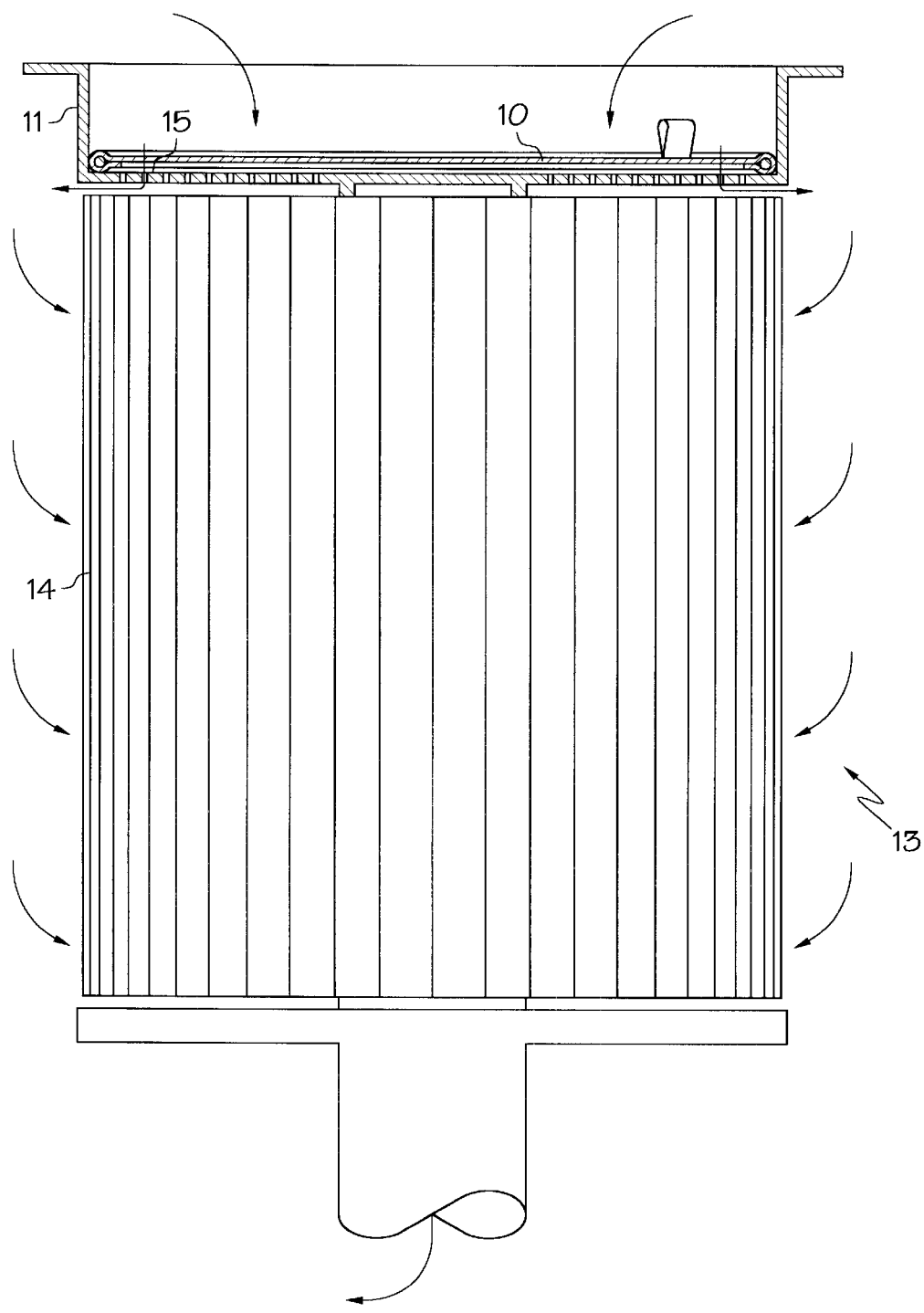
FIG. 3 is an elevational view of a portion of the filter apparatus of the hot tub of FIG. 1 showing the skimmer basket and the pre-filter of the invention in section.

With reference to FIGS. 1–3, the pre-filter 10 of the invention is intended to be used in operable association with the skimmer basket 11 of a hot tub 12. The skimmer basket 11 and a primary filter apparatus 13 are conventional. The skimmer basket 11 basically is mounted in a side wall compartment as shown or a corner compartment of the hot tub directly over the primary filter apparatus 13 as seen in FIG. 3. The skimmer basket 11 is in direct communication with water in the hot tub. A pump (not shown) draws water through the pre-filter 10, the skimmer basket 11, and then the fluted paper filter cartridge 14 of the primary filter apparatus 13. This water is directed by piping to water jets positioned throughout the water tub.

The skimmer basket 11 itself is a shallow rigid open top structure with holes in a bottom wall and side walls. An about one-quarter inch mesh opening is typically used to filter out leaves and other large debris from flowing through the primary filter and permanently clogging it up. Skimmer baskets typically have the same general configuration as depicted, though do differ in diameter, depth and shape depending on the hot tub manufacturer.

Figure 4:
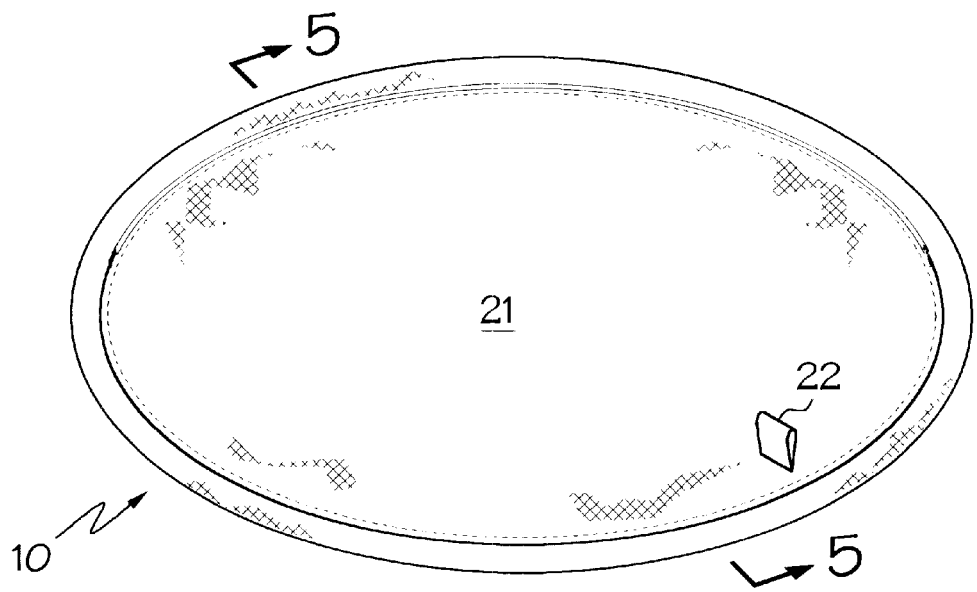
FIG. 4 is a perspective view of the pre-filter of FIG. 1.
Figure 5:
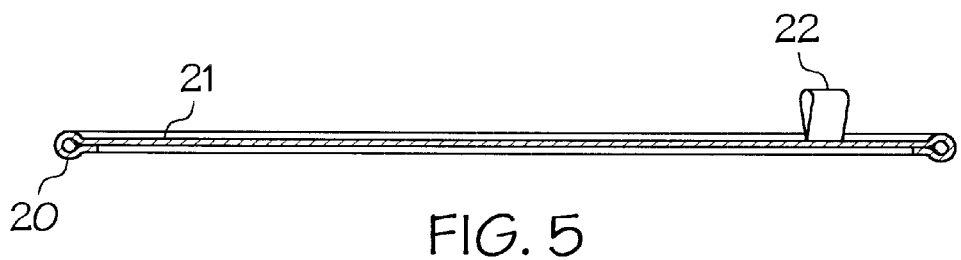
FIG. 5 is a side view in section of the pre-filter of FIG. 4 taken along line 5—5 thereof.

As best seen in FIG. 3, the pre-filter 10 fits snugly within the skimmer basket 11 and sits on a bottom wall. With reference to FIGS. 4 and 5, the pre-filter 10 comprises as its essential components a stabilizing ring 20 and a shaped cleanable filter 21. Each of the essential components of the assembly of the invention is described in detail in the following paragraphs.

Figure 6:
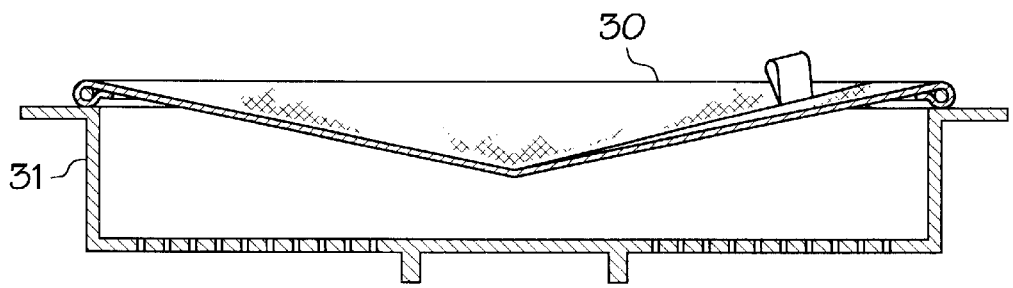
FIG. 6 is a side view in section showing an alternative skimmer basket and pre-filter of the invention.

The stabilizing ring 20 as depicted is a substantially circular ring. It has a diameter sized to work cooperatively with a particular skimmer basket. It can have an outside diameter slightly less than that of the inside diameter of the skimmer basket as seen in FIG. 3 so as to rest snugly within the basket on its bottom wall 15. It can as well have an outside diameter slightly greater than an inside diameter of the skimmer basket as shown in FIG. 6 and further discussed below in which case it rests on a rim of the skimmer basket. Preferably, the diameter of the stabilizing ring is about four inches to about twelve inches as determined by the particular hot tub skimmer basket size.

It should be understood that the stabilizing ring has a shape dependent on the skimmer basket with which it is used. For example, the stabilizing ring can be square or rectangular shaped in addition to circular. As used throughout, the term ring is intended to encompass a circular shape as well as other shapes defined by a closed continuous line.

The stabilizing ring is substantially rigid to retain its shape during use. It is preferably made of a stainless steel to inhibit rusting. It can as well be made of a rigid plastic, a plastic coated steel or any other material having the needed strength, durability and resistance to chemicals in the water.

The filter component of the pre-filer is a shallow shaped cleanable filter. The filter's depth as measured from a horizontal plane defined by the stabilizing ring to its lowest point below the stabilizing ring ranges from substantially flat to about two inches. In essence, the filter is shaped to be shallow in depth and to fit neatly and closely to an underlying support surface such as the shallow skimmer basket typically found in commercially available hot tubs.

The filter 21 is made of a water porous material capable of filtering out hot tub water debris, defined herein to include solid materials, body oils, lotions, soap residue and other unwanted contaminates. The porous material must allow water moving at a relatively high flow rate to pass through while retaining debris. The porous material must also have a strength to withstand the forces of the water flowing through the skimmer basket. Examples of such porous materials include woven and non-woven synthetic fabrics such as polyester, polypropylene and nylon. It further is necessary that the porous material not interfere in any way with the anti-bacterial filter of the primary filter apparatus. In particular, enzymes added to the water by the hot tub user as part of routine water maintenance must be capable of passing through the porous material. The shaped cleanable filter has a porosity of from about 5 microns to about 100 microns, preferably from about 10 microns to about 50 microns. A non-woven synthetic polyester material having a porosity of from about 10 microns to about 20 microns is highly preferred for use in the filter.

As best seen in FIG. 4, the shaped cleanable filter 21 is permanently attached to the stabilizing ring 20 by stitching. An edge of the filter is simply wrapped around the ring and stitched in place. The cleanable filter can as well be welded or melted to the ring e.g. by an ultrasound welding process. As shown, the filter 21 stretches across the stabilizing ring to form a substantially flat profile, lying in substantially the same plane as the stabilizing ring. In actual fact, the filter has a slightly depressed center area due to natural forces.

An optional handle 22 is added to the filter 21 to aid in its separation and removal from the skimmer basket hole for cleaning or replacing purposes. With reference to FIG. 4, the handle is a strap attached, e.g. by securing at both ends to an edge area of the filter. The handle 22 has sufficient length to grasp, but not so long as to interfere with the filtering action of the filter. To remove the filter, the handle is simply grasped and lifted.

Figure 7:
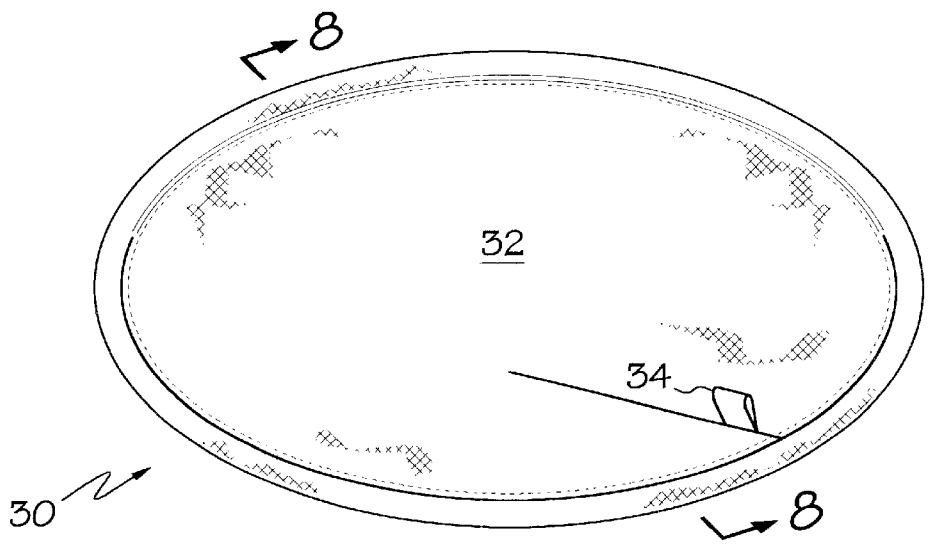
FIG. 7 is a perspective view of the pre-filter of FIG. 6.
Figure 8:
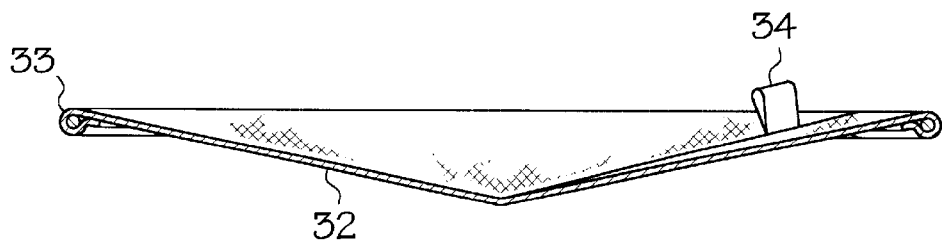
FIG. 8 is a side view in section of the pre-filter of FIG. 7 taken along line 8—8 thereof.

In the embodiment of the invention depicted in FIGS. 6–8, the pre-filter 30 rests on a rim of its operably associated skimmer basket 31. The pre-filter 30 has a shaped cleanable filter 32 extending downwardly from a stabilizing ring 33 to form a depressed center area. More particularly, the filter 32 has a generally inverted dome shape with the apex of the dome in the approximate center of the filter. The inverted dome shape is shallow to conform to the shallow skimmer basket 31 it fits into. The depth of the dome shape as measured by the vertical distance from the horizontal stabilizing ring 33 to the low point of the filter 32 is at least about one-half inch. Preferably, it is about one inch to about two inches, though can be more or less depending on the skimmer basket configuration. A handle 34 is optionally provided on the filter to aid in the pre-filter's removal from the water recirculating line.

It has been found the depressed center area of the filter provides certain advantages. Debris which is trapped by the filter is best retained on the filter when the depressed center area filter shape is present and is most likely to remain there when the filter is removed for cleaning or replacing purposes.

In use, the pre-filter is placed within the skimmer basket or placed on the rim of the skimmer basket. The pre-filter is left in place and allowed to trap debris over several days as hot tub water is pulled through the skimmer basket and filter apparatus. Periodically, the pre-filter is removed. It is cleaned simply by spraying water across or through it. The debris is easily dislodged. Alternatively, the pre-filter can be discarded and a new pre-filter used as a replacement. As readily imagined, the life of the filter cartridges of the primary filter apparatus is significantly prolonged.

The pre-filter of the invention facilitates removal of debris from the hot tub. This is accomplished in seconds and is to be contrasted with the effort required to replace the fluted paper filter cartridge of the primary filter apparatus. The pre-filter is also inexpensive compared to the cost of the filter cartridges. The filter cartridge is still needed because of its anti-bacterial capability in keeping the hot tub water clean and in a substantially pure state. Its useful life, though, is substantially extended by the pre-filter of the invention. Additionally, it is theorized the pre-filter enhances the water purity of the hot tub. By trapping substantially all contamination of various sorts on the pre-filter including those which serve as a host for bacteria growth, the filter cartridge can more effectively treat the relatively pure water which reaches it. Further, the inexpensive pre-filter is more likely to be timely replaced thereby removing the contaminates from the hot tub before any build-up can occur.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A pre-filter for positioning in a water recirculating flow path of a hot tub having a primary filter, said pre-filter comprising a stabilizing ring dimensioned for operable association with a rigid support surface and a shallow shaped cleanable filter having a porosity of from about 5 microns to about 100 microns, said filter permanently secured to the stabilizing ring for removing debris from water passing therethrough, whereby the pre-filter is readily removed from the water recirculating flow path without a need to interrupt the circulation of water through the flow path whereby debris is caught by the shaped cleanable filter of the pre-filter, thereby increasing the effective life of the primary filter.

2. The pre-filter of claim 1 wherein the shaped cleanable filter further has a handle attached thereto for grasping and removing from the water recirculating flow path.

3. The pre-filter of claim 1 wherein the shaped cleanable filter is made from a non-woven material.

4. The pre-filter of claim 3 wherein the shaped cleanable filter is made from a non-woven synthetic material having a porosity of from about 10 microns to about 50 microns.

5. The pre-filter of claim 4 wherein the shaped cleanable filter is a non-woven synthetic polyester material having a porosity ranging from about 10 microns to about 20 microns.

6. The pre-filter of claim 4 wherein the stabilizing ring has a circular shape with a diameter of from about four inches to about twelve inches.

7. The pre-filter of claim 6 wherein the stabilizing ring is resistant to chemicals found in hot tub water.

8. The pre-filter of claim 1 wherein the shaped cleanable filter is substantially flat.

9. The pre-filter of claim 1 wherein the shaped cleanable filter extends downwardly from the stabilizing ring to form a depressed center area.

10. The pre-filter of claim 9 wherein the shaped cleanable filter has a generally inverted dome shape with a depth of at least about one-half inch.

11. The pre-filter of claim 10 wherein the shaped cleanable filter ranges from about one inch to about two inches in depth as measured from the stabilizing ring to the low point of the inverted dome-shaped filter.

12. A pre-filter for use with a skimmer basket placed in a water recirculating flow path of a hot tub having a primary filter, said pre-filter comprising a stabilizing ring dimensioned for operable association with the skimmer basket and a shallow shaped cleanable filter permanently secured to the stabilizing ring for removing debris from water passing therethrough wherein the shaped cleanable filter is made from a non-woven synthetic material having a porosity of from about 10 microns to about 50 microns and lies in substantially the same plane as the stabilizing ring, whereby the pre-filter is readily removed from the skimmer basket on a periodic basis without a need to interrupt the circulation of water through the flow path thereby increasing the time interval between cleaning or replacement of the primary filter.

13. The pre-filter of claim 12 wherein the shaped cleanable filter further has a handle attached thereto for grasping and removing from the skimmer basket.

14. The pre-filter of claim 12 wherein the stabilizing ring has a circular shape with a diameter of from about four inches to about twelve inches and is made from stainless steel.

15. The pre-filter of claim 12 wherein the cleanable filter is a non-woven synthetic polyester material having a porosity of from about 10 microns to about 20 microns.

16. A pre-filter for a skimmer basket positioned in a water recirculating flow path of a hot tub having a primary filter, said pre-filter comprising a stabilizing ring dimensioned for freely sitting on the skimmer basket and a shallow shaped cleanable filter permanently secured to the stabilizing ring for removing debris from water passing therethrough wherein the shaped cleanable filter is made from a non-woven synthetic material having a porosity of from about 10 microns to about 50 microns and extends downwardly about one inch to about two inches from the stabilizing ring in a generally inverted dome shape, whereby the pre-filter is readily removed from the skimmer basket on a periodic basis without a need to interrupt the circulation of water through the flow path thereby increasing the time interval between cleanings or replacement of the primary filter.

17. The pre-filter of claim 16 wherein the shaped cleanable filter further has a handle attached thereto for grasping and removing the pre-filter from the skimmer basket.

18. The pre-filter of claim 16 wherein the stabilizing ring has a circular shape with a diameter of from about four inches to about twelve inches and is made from stainless steel.

19. The pre-filter of claim 16 wherein the cleanable filter is a non-woven synthetic polyester material having a porosity of from about 10 microns to about 20 microns.

* * * * *